United States Patent

Kosik et al.

[11] Patent Number: 6,080,085
[45] Date of Patent: Jun. 27, 2000

[54] CONTROL SYSTEM, IN PARTICULAR EMERGENCY CONTROL SYSTEM, OF AN AUTOMATIC CLUTCH

[75] Inventors: Franz Kosik, Ostfildern; Michael Salecker, Buehl; Martin Zimmermann, Sasbach, all of Germany

[73] Assignees: Luk Getriebe-systeme GmbH; DaimlerChrysler AG

[21] Appl. No.: 09/180,084

[22] PCT Filed: Apr. 23, 1997

[86] PCT No.: PCT/EP97/02054

§ 371 Date: Nov. 2, 1998

§ 102(e) Date: Nov. 2, 1998

[87] PCT Pub. No.: WO97/42428

PCT Pub. Date: Nov. 3, 1997

[30] Foreign Application Priority Data

May 2, 1996 [DE] Germany ............... 196 17 567

[51] Int. Cl.[7] ................................. F16D 48/06
[52] U.S. Cl. ................. 477/180; 477/70; 477/906
[58] Field of Search ................. 477/74, 76, 77, 477/78, 906, 180, 70

[56] References Cited

U.S. PATENT DOCUMENTS

| Re. 36,186 | 4/1999 | White et al. ............. 477/906 X |
| 4,843,915 | 7/1989 | Sugimura et al. ........ 477/906 X |
| 5,609,067 | 3/1997 | Mitchell et al. ......... 477/906 X |
| 5,632,706 | 5/1997 | Kremmling et al. ......... 477/74 |

FOREIGN PATENT DOCUMENTS

| 21 18 830 | 11/1972 | Germany . |
| 34 21 387 | 12/1985 | Germany . |
| 34 30 983 | 3/1986 | Germany . |
| 34 43 015 | 6/1986 | Germany . |
| 43 24 415 | 2/1994 | Germany . |
| 43 26 862 | 3/1994 | Germany . |
| 42 37 983 | 5/1994 | Germany . |
| 2113341 | 8/1983 | United Kingdom . |

*Primary Examiner*—Khoi Q. Ta
*Attorney, Agent, or Firm*—Evenson, McKeown, Edwards & Lenahan, PLLC

[57] ABSTRACT

The invention relates to a control system, in particular an emergency control system, of an automatic clutch. The clutch can operate with slip controlled by the driving speed when engaged, or can be disengaged or remain disengaged when the engine speed is excessive, and can also be disengaged when there is an idling signal.

14 Claims, 1 Drawing Sheet

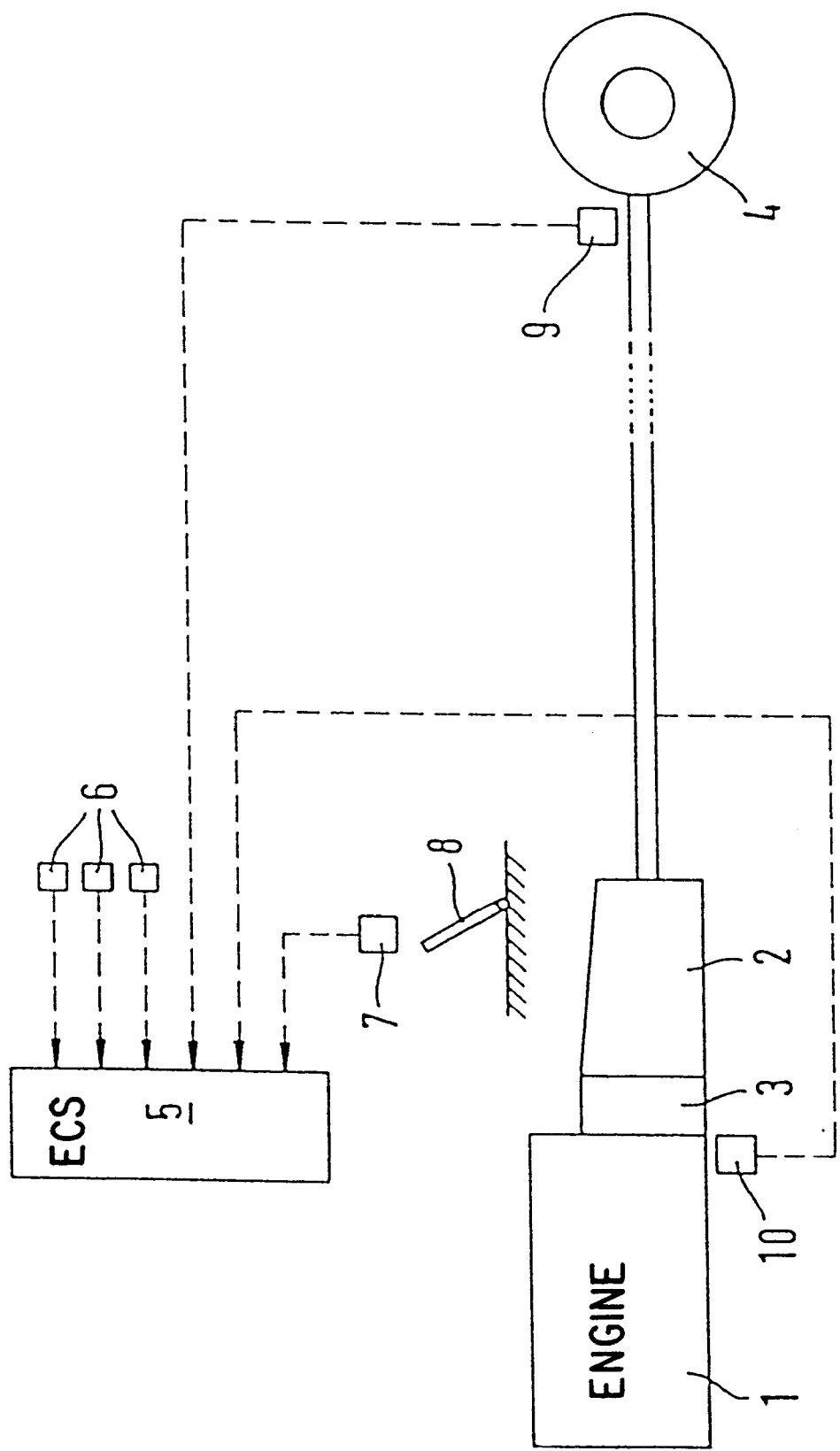

CONTROL SYSTEM, IN PARTICULAR EMERGENCY CONTROL SYSTEM, OF AN AUTOMATIC CLUTCH

BACKGROUND AND SUMMARY OF THE INVENTION

The invention relates to the control system of an automatic clutch which is arranged in the drive train of a motor vehicle with a driver or manual shift transmission and for the actuation of which the control system interacts with a sensor system for identifying parameters which indicate a shift intention on the part of the driver, the clutch, at least in an emergency operating mode when the sensor system is disrupted, disengaging when the throttle valve of the vehicle engine closes, and engaging when the throttle valve opens.

In motor vehicles with manual shift transmission and an automatic clutch, a sensor system of greater or lesser extensiveness should be present in order to identify shift intentions on the part of the driver. In this context, DE 42 37 983 A1 discloses using corresponding sensors to detect the position of the accelerator pedal, inter alia the position and/or movements of the shift lever of the transmission and also the position of the throttle valve, which determines the engine power output, and the engine speed. Emergency control is effected in the event of disruptions to the sensor system or to individual sensors.

If, for example, the engine speed can no longer be detected, the clutch is engaged if the excursion (travel) of the accelerator pedal from its position of rest exceeds a threshold value, and the clutch is disengaged when the threshold value is undershot. If the sensor system is disrupted in other ways, correspondingly modified emergency control can be effected. Thus, for example in the event of failure of the accelerator pedal sensor, the clutch is disengaged as soon as the engine speed falls below a relatively low threshold value, and the clutch is engaged above this threshold value.

DE 43 24 415 A1 shows a further clutch control system, in which the clutch is actuated in dependence on a sensor system which detects the respective throttle valve position. In this case, a redundant arrangement is provided in such a way that in the event of interference with a first electronic arrangement for detecting the throttle valve position, a changeover is made to another device, which differs structurally from the first device. In this case, therefore, a high degree of safeguarding is ensured by asymmetrical redundancy.

The object of the invention, then, is to provide a clutch control system which is advantageous in particular for emergency operation.

In the case of a control system of the type specified in the introduction, this object is achieved according to the invention by virtue of the fact that the clutch—at least in the event of emergency operation—disengages, or operates with slips, in the event of a high threshold value of the engine speed being exceeded.

The invention is based on the general concept of preventing a rapidly moving vehicle from being able to force excessively high speeds on the engine when the clutch is engaged.

Since the clutch at least partially disengages as soon as the engine speed exceeds a high threshold value, overspeed protection is ensured during operating phases of the vehicle in which the clutch—for instance during a descent in a low gear—has disengaged with the accelerator pedal not actuated and thus the throttle valve essentially closed and subsequently engages again in the event of renewed actuation of the accelerator pedal and the throttle valve accordingly opening. In such driving states, the driving speed of the vehicle may be very high and the speed of the clutch output may be distinctly above the speed of the clutch input during the engagement operation, with the result that when the clutch is engaged, the engine could be brought to a destructive speed by the vehicle which continues to move.

The invention therefore takes account of the fact that in the case of clutch control which is dependent on the throttle valve position—that is to say the clutch disengages when the throttle valve closes—relatively long operating phases can occur during which the vehicle continues to move with the clutch disengaged and increases its speed. If, despite the speed increase, the driver does not shift the transmission to a higher gear (for faster traveling) before he actuates the accelerator pedal again, the actuation of the accelerator pedal and corresponding opening of the throttle valve and also the associated engagement of the clutch can give rise to dangerous operating states for the engine.

In the context of utilizing the engine speed for clutch control, it is advantageous that conventional engines nowadays with electronic engine control regularly employ a speed sensor whose signals can readily be utilized for clutch control as well. In this respect, therefore, a separate sensor is not required for the clutch control system.

Moreover, the invention provides for other signals that are present to be utilized for clutch control as far as possible, even in the case of emergency control.

Thus, a preferred embodiment may make provision for the automatic clutch to engage, and/or to disengage, with a relatively long slip phase in the event of a vanishing driving speed and with a short slip phase in the event of a relatively high driving speed. By virtue of this method of operation of the clutch dependent on the driving speed of the vehicle, relatively long slip phases are possible only in the event of a very slow driving speed, as is typical of the starting procedure of a vehicle. At normal driving speeds, very short slip phases may mean that the otherwise possible heating of the clutch can be avoided. A driving speed signal is routinely available via the speedometer of the vehicle.

In a particularly expedient refinement of the invention, the accelerator pedal, in its position of rest, actuates an idling switch, in which case the idling signal generated by the latter can then be processed as a command for disengagement of the clutch. This takes account of the fact that in today's electronic engine controllers, the throttle valve is not solely controlled by the accelerator pedal actuated by the driver, and, therefore, does not always assume its closed position when the accelerator pedal is not actuated. Utilizing the idling signal means that a particularly unambiguous criterion is used for disengagement of the clutch. In particular, it is ensured that the driver—at least in the event of the emergency operation—can always achieve disengagement of the clutch by lifting his foot from the accelerator pedal.

BRIEF DESCRIPTION OF THE DRAWING

The invention will be explained in more detail below with reference to the drawing.

In the drawing, the single FIGURE diagrammatically shows the drive train of a motor vehicle.

DETAILED DESCRIPTION OF THE DRAWING

A vehicle engine 1 is connected via a manual shift transmission 2 and also an automatically operating clutch 3 to driving wheels 4 of the vehicle, which is not otherwise illustrated.

The clutch is actuated by means of an electronic control system 5, which normally evaluates the signals from various sensors 6 for this purpose. If, on the other hand, the signals from these sensors are not available on account of a defect, the control system 5 operates in an emergency operating mode.

For this purpose, first of all the signal from an idling switch 7 is used, which switch is activated by an accelerator pedal 8, serving to control the engine power output, as soon as the accelerator pedal 8 assumes its original position, it being forced into said position by a restoring spring.

As soon as the idling switch 7 generates a signal, that is to say when the accelerator pedal 8 is not being actuated and assumes its original position, the clutch 3 is in any case disengaged in the event of emergency operation.

Furthermore, the signal from a speedometer 9 is evaluated, to be precise in such a way that the clutch 3 engages very gently with a relatively long slip phase in the event of a very low driving speed or in the event of a vanishing driving speed, while the clutch engages with a very short slip phase in the event of a relatively high driving speed above a crawl speed.

Finally, the signal from a speed sensor 10 assigned to the vehicle engine 1 is also utilized to the effect that the automatic clutch 3 disengages or remains disengaged or at least changes to a slip state as soon as the engine speed exceeds a high threshold value, which corresponds, for instance, to the maximum permissible engine speed. In this way, it is ensured that a vehicle which has reached a relatively large speed with the clutch disengaged, for instance on an incline, cannot bring the engine to an excessive speed.

The clutch 3 engages automatically in each case when none of the abovementioned signals for disengaging or for maintaining disengagement of the clutch 3 is present.

What is claimed is:

1. An apparatus for operating an automatic clutch arranged in a drive train of a vehicle having a manual shift transmission, comprising:

a sensor system sensing vehicle parameters;

a control system coupled to said sensor system and interacting therewith to identify an intention on a part of a vehicle driver to shift the transmission;

wherein said control system is operatively coupled with the clutch such that, at least in an event of an emergency control when the sensor system is disrupted, the control system disengages the clutch when a throttle valve of an engine of the vehicle closes, and engages the clutch when the throttle valve opens; and further wherein at least in the event of the emergency control of the clutch, said control system uses signals from a speed sensor of the sensor system for clutch control, which speed sensor is assigned to the engine and senses the speed of the engine, the control system functioning so as to one of disengage and operate with slip the clutch as soon as the engine speed exceeds a defined threshold value.

2. The apparatus as claimed in claim 1, wherein the clutch engages with a relatively long slip phase in the event of a diminishing driving speed and with a very short slip phase in the event of a relatively high driving speed of the vehicle.

3. The apparatus as claimed in claim 1, wherein an accelerator pedal actuated by the driver is assigned an idling signal switch, which is actuated when the accelerator pedal is not actuated, the clutch being disengaged when an idling signal from the idling signal switch occurs.

4. The apparatus as claimed in claim 1, wherein the clutch disengages when an engine controller generates an idling signal.

5. The apparatus as claimed in claim 1, wherein the speed sensor forms part of an engine controller for the vehicle engine.

6. The apparatus as claimed in claim 2, wherein an accelerator pedal actuated by the driver is assigned an idling signal switch, which is actuated when the accelerator pedal is not actuated, the clutch being disengaged when an idling signal from the idling signal switch occurs.

7. The apparatus as claimed in claim 2, wherein the clutch disengages when an engine controller generates an idling signal.

8. The apparatus as claimed in claim 3, wherein the clutch disengages when an engine controller generates an idling signal.

9. The apparatus as claimed in claim 2, wherein the speed sensor forms part of an engine controller for the vehicle engine.

10. The apparatus as claimed in claim 3, wherein the speed sensor forms part of an engine controller for the vehicle engine.

11. The apparatus as claimed in claim 4, wherein the speed sensor forms part of an engine controller for the vehicle engine.

12. The apparatus according to claim 1, wherein said defined threshold value is a maximum permissible engine speed.

13. A method of controlling an automatic clutch arranged in a drive train of a vehicle having a manual shift transmission, the method comprising the acts of:

identifying parameters of the vehicle which indicate a shift intention on a part of a driver of the vehicle;

disengaging the automatic clutch when a throttle valve of a vehicle engine closes and engaging the clutch when the throttle valve opens at least in an emergency control situation when the sensor system is disrupted;

disengaging or operating the clutch with slip when an engine speed detected by a speed sensor assigned to the engine exceeds a defined threshold value.

14. The method according to claim 13, wherein said defined threshold value is a maximum permissible engine speed.

* * * * *